C. T. SCHOEN.
FLEXIBLE METALLIC TUBING.
APPLICATION FILED MAY 21, 1910.

984,856.

Patented Feb. 21, 1911.

Witnesses:
W. H. Finckel Jr.
E. A. Finckel

Inventor:
Charles T. Schoen
by Wm. H. Finckel
Atty.

UNITED STATES PATENT OFFICE.

CHARLES T. SCHOEN, OF MEDIA, PENNSYLVANIA.

FLEXIBLE METALLIC TUBING.

984,856. Specification of Letters Patent. Patented Feb. 21, 1911.

Application filed May 21, 1910. Serial No. 562,771.

*To all whom it may concern:*

Be it known that I, CHARLES T. SCHOEN, a citizen of the United States, residing at Media, in the county of Delaware and State of Pennsylvania, have invented a certain new and useful Improvement in Flexible Metallic Tubing, of which the following is a full, clear, and exact description.

The object of this invention is to provide a flexible metallic hose, especially for use as coupling hose in the air-brake systems of railway trains. In actual use these hose are exposed to severe and sometimes sudden strains, and also to blows, which have a tendency to disable them and put them out of service. Such hose has been made in a variety of ways and of a variety of materials, in single ply, double ply, and even triple ply. In the present invention, it is preferred to use a two-ply hose, that is to say, one where there is an inner tube made of a metal strip spirally wound upon itself and connected with the members of the hose coupling, and an outer tube inclosing the inner tube and likewise made of a metal strip spirally wound upon itself and connected with the coupling members independently of the inner tube, so as to afford a sort of compensatory arrangement for taking up the strains to which the tubes are subjected, and to shield the inner tube, through which the fluid is conducted, from injury by blows falling upon the outer tube.

In order to secure the inner tube to the coupling members in an efficient manner, so that it will remain in firm union with the coupling members while in use, I provide a bushing having a flange engaged by the members of a divided coupling, and provided with a spiral rib to engage the joints of the inner tube. This flanged bushing also serves to receive and support a packing interposed between the members of the coupling.

Having thus stated the nature and object of my invention, I will proceed to describe the same in detail, and then particularly point out and distinctly claim the part, improvement or combination which I claim as my invention.

Figure 1:
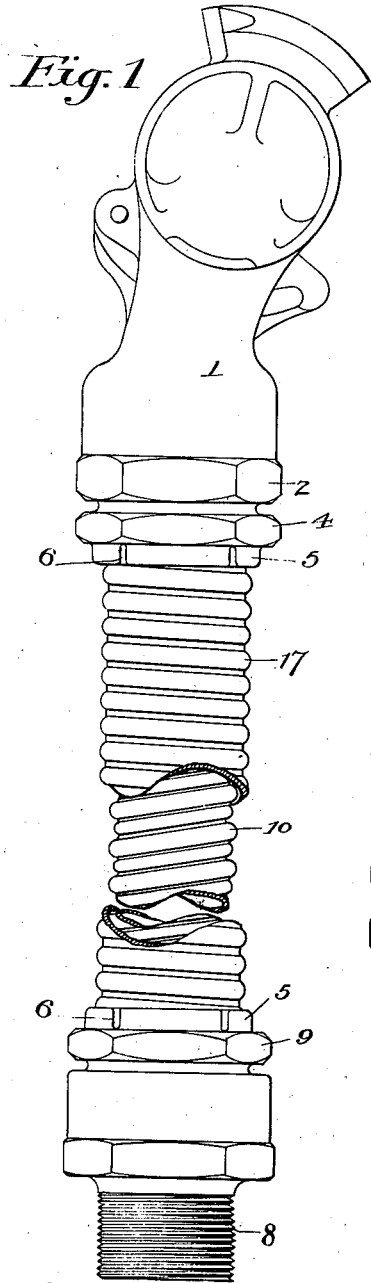
Figure 2:
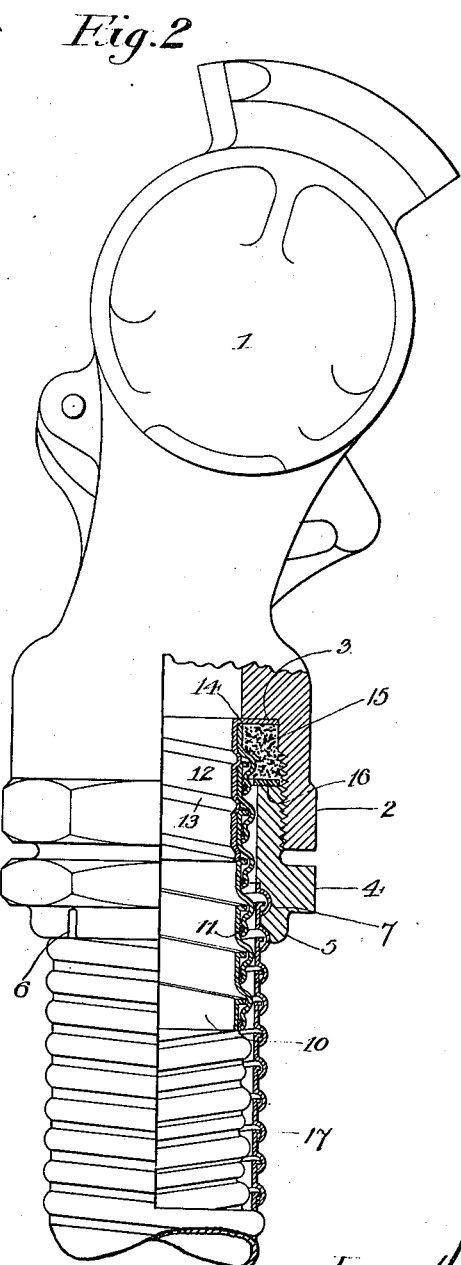

In the accompanying drawing illustrating the invention, in the several figures of which like parts are similarly designated, Figure 1 is an elevation with part of the outer tube broken away to expose the inner tube, and this inner tube broken out. Fig. 2 is an elevation and partial half section of one end of the hose and divided coupling, on a larger scale.

The train pipe coupling device 1, may be of any approved construction, terminating in an internally threaded socket 2, having a shoulder 3. Fitted into this socket is the externally threaded nut 4, having the slit and compressible lip or flange 5, the slits being shown at 6, and also having the internal spiral groove 7. The coupling member 1 is applied to the free end of the hose to be engaged by a complemental member on the free end of a similar hose, in order to connect the pipes between two cars or other objects. The other end of the hose is provided with a coupling member 8, having an internal socket similar to the socket on the first described coupling member, and also provided with a nut 9 in all essential respects similar to the nut 4, so that the hose or tube may be secured alike at opposite ends in these coupling members. The coupling member 8 is designed for connection with the stationary air pipes on the cars. The socketed part of the coupling and its nut at either end of the tubing, constitute the parts herein referred to as a divided coupling, or in words of similar import, and as a tube-receiving device.

The hose is composed of an inner tube 10, made of a flanged strip of metal spirally wound into a connected tube, and rendered air and water tight by any suitable interposed packing 11. This tube 10 is connected with a bushing 12, having a spiral projection or thread 13 which engages the joints between the coils of the strip in order to effect a strong union with the inner tube. This bushing is provided with a flange 14 fitted against the shoulder 3 of the coupling member 1, and against this flange is placed the packing 15. At the opposite end of this packing is arranged a washer 16 which is interposed between said packing and the inner end of the nut 4. The bushing 12 not only thus serves to secure the inner tube to the coupling member but it also serves to resist the pressure placed upon the packing by screwing in the nut, and thus prevents the deformation of the inner tube. The outer tube 17 is also composed of a strip of metal coiled upon itself spirally to form a flexible tube, and this outer tube is fitted to the spiral groove 7 in the nut 4. The outer tube preferably is wound in a direction opposite to the winding of the inner tube. As already indicated, the other end of the tube is secured in the opposite coupling device in a manner similar to that just described.

While the form of spiral strips herein shown for the construction of the inner tube and the outer tube is preferred, still the invention is not limited thereto; and while I have shown the invention as applied to air-brake hose, it is to be understood that it is applicable to flexible metallic tubing for any purpose; the essentials being that the arrangement shall conform to accepted standards and tests.

In using metallic hose for air-brake purposes, and indeed for any purpose, there is a possibility of destroying the hose, or at least causing leaks by severe twisting in the direction opposite to that in which its constituent strip has been coiled; and it is also liable to be dented and otherwise deformed by lumps of ore and coal, and other heavy substances falling upon it. By the construction described, these objections are overcome, and in addition the outer tube serves to prevent, to a very large extent, the corrosion of the inner tube which alone receives immediately the fluid to be conveyed.

The coiling of the outer tube in a direction opposite to the coiling of the inner tube, serves to convert the uncoiling effect of twisting the outer tube into a tightening of the inner tube. The bushing for securing the inner tube overcomes the tendency to injure the tube by severe pull. For ordinary service the inner tube which is air and water tight has sufficient strength, but when the cars are pulled apart without uncoupling the hose, as is frequently the case, the hose might be broken or pulled apart, and it is at this juncture that the outer tube is of assistance in sustaining undue strains. If the inner tube were made of a strength equal to these unusual strains, its flexibility would be decreased to such an extent that the act of coupling together would be exceedingly difficult on account of this difference and the difficulty of getting it to bend to the required radius. In my construction, the outer tube has a little greater flexibility than the inner tube and there is, therefore, nothing to retard the movement of the two.

As already indicated, the bushing which receives the inner tube takes the longitudinal strains, and also prevents the packing from crushing the ends of the inner tube when the nut is screwed down excessively, and the flange of this bushing affords a good base for the packing. By the construction described, furthermore, repairs and renewals may be made more expeditiously and economically than with constructions heretofore designed. The slitting or slotting of the lip of the nut admits of the nut being pinched down tightly on the outer tube.

What I claim is:—

1. Flexible metallic tubing, composed of an inner tube spirally wound in one direction, an outer tube spirally wound in the opposite direction, a flanged bushing arranged within the inner tubing and spirally engaged therewith, a socketed coupling in which the bushing and inner tube are received, a packing surrounding the inner end of the inner tube and the bushing and engaging the flange of the bushing, and a nut to which the outer tube is secured, said nut secured within the socketed coupling and holding the inner tube, the bushing, and the packing in place therein.

2. Flexible metallic tubing, comprising an inner tube and an outer tube, a tube-receiving device socketed at one end, a flanged bushing arranged in said socketed end and having a spiral thread in engagement with the interior of the inner tube, and a nut fitted in the tube-receiving device and having an internal spiral groove engaging the outer tube.

3. Flexible metallic tubing, composed of an inner tube and an outer tube, a socketed coupling, a flanged bushing arranged in said socketed coupling and having a spiral thread in interior engagement with the inner tube, and a nut fitted in the coupling and having a spiral groove engaging the outer tube, and packing interposed between the flanged bushing and nut, said nut having a slit lip pinched about the outer tube.

In testimony whereof I have hereunto set my hand this 19th day of May A. D. 1910.

CHARLES T. SCHOEN.

Witnesses:
 Robt. B. Ross,
 Robert I. Smith.